(12) United States Patent
Palanki et al.

(10) Patent No.: US 8,656,248 B2
(45) Date of Patent: Feb. 18, 2014

(54) HIERARCHICAL CRC SCHEME

(75) Inventors: Ravi Palanki, San Diego, CA (US);
Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1166 days.

(21) Appl. No.: 12/241,371

(22) Filed: Sep. 30, 2008

(65) Prior Publication Data
US 2009/0158120 A1 Jun. 18, 2009

Related U.S. Application Data

(60) Provisional application No. 61/013,466, filed on Dec. 13, 2007.

(51) Int. Cl.
*H03M 13/00* (2006.01)

(52) U.S. Cl.
USPC ............ 714/758; 714/701; 714/752; 714/755

(58) Field of Classification Search
None
See application file for complete search history.

(56) References Cited

U.S. PATENT DOCUMENTS

| | | | | |
|---|---|---|---|---|
| 5,935,268 | A * | 8/1999 | Weaver | 714/758 |
| 6,405,340 | B1 * | 6/2002 | Irvin et al. | 714/774 |
| 6,421,805 | B1 * | 7/2002 | McAuliffe | 714/756 |
| 6,903,887 | B2 * | 6/2005 | Asano et al. | 360/31 |
| 2002/0108086 | A1 | 8/2002 | Irvin et al. | |
| 2003/0139140 | A1 * | 7/2003 | Chen et al. | 455/67.1 |
| 2004/0158793 | A1 * | 8/2004 | Blightman et al. | 714/758 |
| 2005/0071725 | A1 * | 3/2005 | Gibart | 714/755 |
| 2006/0159260 | A1 * | 7/2006 | Pereira et al. | 380/44 |
| 2007/0234134 | A1 | 10/2007 | Shao et al. | |
| 2007/0258402 | A1 * | 11/2007 | Nakamata et al. | 370/329 |
| 2009/0077456 | A1 * | 3/2009 | Pi et al. | 714/807 |
| 2009/0100320 | A1 * | 4/2009 | Higgs et al. | 714/807 |
| 2009/0119568 | A1 * | 5/2009 | Shen et al. | 714/781 |
| 2010/0293372 | A1 * | 11/2010 | Fischer et al. | 713/168 |
| 2012/0079359 | A1 * | 3/2012 | Buckley et al. | 714/807 |

FOREIGN PATENT DOCUMENTS

EP 1971096 A2 9/2008

OTHER PUBLICATIONS

International Search Report and Written Opinion—PCT/US2008/086105—International Search Authority, European Patent Office, May 8, 2009.
Taiwan Search Report—TW097148542—TIPO—May 28, 2012.

\* cited by examiner

*Primary Examiner* — Albert Decady
*Assistant Examiner* — Justin R Knapp
(74) *Attorney, Agent, or Firm* — Larry J. Moskowitz

(57) ABSTRACT

A hierarchical cyclic redundancy check (CRC) is provided that enables CRC appending and detection. A message that includes a first message portion and a second message portion is transmitted to two or more receivers. The receivers are not aware of the first message portion. One of the receivers can be aware of the second message portion of the message. Each portion of the message can be encoded with a CRC in order to provide protection. The receiver that is aware of the second message portion is provided a higher level of cyclic redundancy check (CRC) protection than the receivers that are not aware of the second message portions.

20 Claims, 15 Drawing Sheets

HIERARCHICAL CRC SCHEME

CROSS-REFERENCE

This application claims the benefit of U.S. Provisional Application Ser. No. 61/013,466, filed Dec. 13, 2007, entitled "HIERARCHICAL CRC SCHEME," and assigned to the assignee hereof and the entirety of which is incorporated herein by reference.

BACKGROUND

I. Field

The following description relates generally to wireless communications systems and more particularly to cyclic redundancy check appending and detection.

II. Background

Wireless communication systems are widely deployed to provide various types of communication and to transfer information regardless of where a user is located (inside or outside a structure) and whether a user is stationary or moving (e.g., in a vehicle, walking). For example, voice, data, video and so forth can be provided through wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

A common message is a message intended for more than one message recipient. An example of a common message is an assignment message. Other messages can be private messages known a priori by one message recipient and the other recipients would like to receive the private messages. Thus, in order to transmit a common message to two or more recipients and a private message to one or more of the recipients, two separate messages need to be sent. Each message should include cyclic redundancy check (CRC) bits to mitigate false alarms and/or to detect failures associated with message transmission.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with cyclic redundancy check (CRC) appending and detection. A first user can be provided with a first level of protection and a second user can be provided with a different, possibly higher, level of protection. The disclosed CRC appending and detection can be implemented with low complexity.

According to an aspect is a method for enabling hierarchical cyclic redundancy check (CRC) protection in a communication environment. The method includes combining a first message and a second message and applying a CRC encoding scheme to the combined messages. The CRC encoding scheme provides different protection levels depending on whether there is knowledge of the second message or no knowledge of either message. The method also includes transmitting the combined messages with the applied CRC encoding scheme.

Another aspect relates to a wireless communications apparatus that includes a memory and a processor. The memory retains instructions related to combining a first message and a second message and applying a CRC encoding scheme to the combined messages. The memory also retains instructions related to transmitting the combined messages with the applied CRC encoding scheme. The CRC encoding scheme provides different protection levels. The processor is coupled to the memory and is configured to execute the instructions retained in the memory.

A further aspect relates to a wireless communications apparatus that provides a hierarchical cyclic redundancy check (CRC) scheme. The apparatus includes means for concatenating a first message and a second message and means for applying a CRC encoding scheme to the combined messages. The apparatus also includes means for conveying the combined messages with the applied CRC encoding scheme. The CRC encoding scheme provides different protection levels.

Yet another aspect relates to a computer program product comprising a computer-readable medium. The computer-readable medium includes a first set of codes for causing a computer to combine a first message and a second message and a second set of codes for causing the computer to apply a CRC encoding scheme to the combined messages. The computer-readable medium also includes a third set of codes for causing the computer to send the combined messages with the applied CRC encoding scheme to two or more devices. The first message is not known a priori by a plurality of devices and the second message is known a priori by a single device.

Still another aspect relates to at least one processor configured to provide hierarchical cyclic redundancy check (CRC) information. The processor includes a first module for combining a first message and a second message and a second module for applying a CRC encoding scheme to the combined messages. The processor also includes a third module for transmitting the combined messages with the applied CRC encoding scheme to two or more devices. The CRC encoding scheme provides different protection levels.

A further aspect relates to a method for receiving a message that includes a hierarchical cyclic redundancy check (CRC). The method includes receiving a combined message that includes a first message and a second message and performing a CRC check. The method also includes determining whether the combined message was successfully received.

Another aspect relates to a wireless communications apparatus that includes a memory and a processor. The memory retains instructions related to receiving a combined message that includes a first message and a second message and performing a CRC check. The memory also retains instructions related to determining if the combined message was successfully received. The processor is coupled to the memory and is configured to execute the instructions retained in the memory.

Still another aspect relates to a wireless communications apparatus that decodes a message that includes hierarchical cyclic redundancy check (CRC) protection. The apparatus includes means for receiving a combined message that includes a first message and a second message and means for performing a CRC check. The apparatus also includes means for determining if the combined message was successfully received.

Yet another aspect relates to a computer program product that includes a computer-readable medium. The computer-readable medium includes a first set of codes for causing a computer to receive a combined message that includes a first message and a second message. Also included is a second set of codes for causing the computer to perform a CRC check. The computer-readable medium also includes a third set of codes for causing the computer to ascertain if the combined message was successfully received.

A further aspect relates to at least one processor configured to receive a message that includes a hierarchical cyclic redundancy check (CRC). The processor includes a first module for receiving a combined message that includes a first message and a second message. The processor also includes a second module for performing a CRC check and a third module for determining if the combined message was successfully received.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
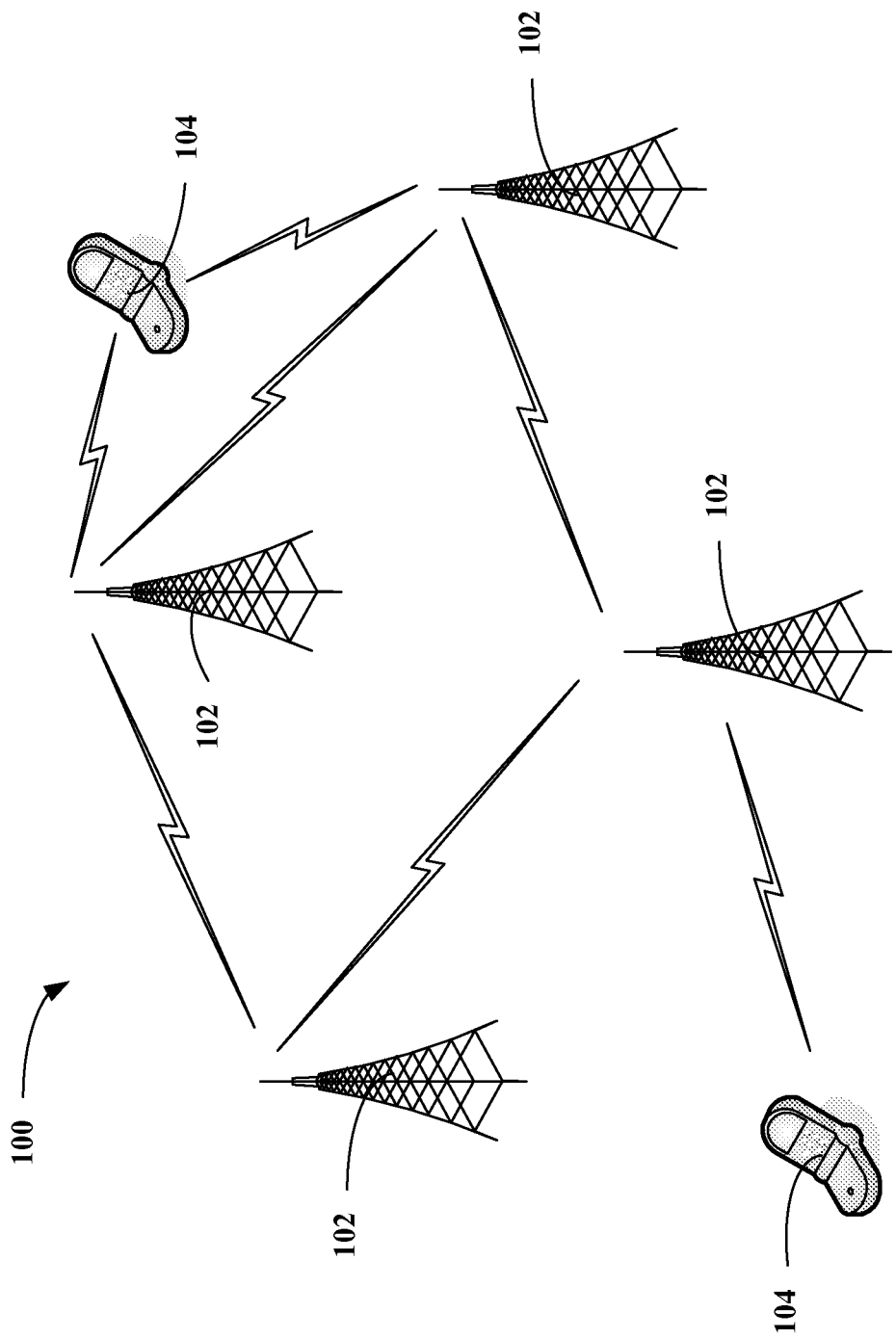
FIG. 1 illustrates a wireless communication system in accordance with various aspects presented herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, and so forth, and/or may not include all of the devices, components, modules and so forth, discussed in connection with the figures. A combination of these approaches may also be used.

Referring now to FIG. 1, a wireless communication system 100 in accordance with various aspects presented herein is illustrated. System 100 can comprise one or more base stations 102 in one or more sectors that receive, transmit, repeat, and so forth, wireless communication signals to each other and/or to one or more mobile devices 104. Each base station 102 can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, and so forth). Each mobile device 104 can comprise one or more transmitter chains and receiver chains, which can be utilized for a multiple input multiple output (MIMO) system. Each transmitter and receiver chain can comprise a plurality of components associated with signal transmission and reception (e.g., processors, modulators, multiplexers, demodulators, demultiplexers, antennas, and so on), as will be appreciated by one skilled in the art.

System 100 can be configured to enable a hierarchical CRC scheme wherein a combined message intended for two or more different users (e.g., mobile devices 104) is transmitted. None of the two or more mobile device have knowledge of a first portion of the combined message, which can also be referred to as a common message portion. Further, the combined message includes a second portion (e.g., private message portion, partially known message) that can be utilized by the two or more different users. Only one of the users might know the second message a priori. The user that knows the second portion can utilize that portion for additional CRC protection. The other users are still interested in receiving the second portion of the message.

A cyclic redundancy check (CRC) is enabled for a first mobile device that is interested in the first message portion (not the second message portion) and another CRC (with a higher level of protection) is enabled for a second mobile device that is interested in both portions (first message portion and second message portion).

A CRC provides error detection and is a process utilized to verify the integrity of a message. Generally, a CRC character is generated at the end of the message by the transmitting device. The receiving device performs a calculation, similar to the calculation performed by the transmitting device, and compares its calculated result with the CRC character. If the results are the same, the transmission was successful. If the results are different, the transmission failed, and the receiving device might request retransmission of the message.

In an example, a message is to be sent to a first user and a second user. The message includes a first message portion (L1 bits), which is unknown to both users. The message also includes a second message portion (L2 bits), which is known by the first user, but is not known by the second user. The total number of bits (L), including CRC bits (L3), can be expressed as:

$$L = L1 + L2 + L3.$$

Continuing the above example, the first user is interested in the first message and desires to use the second message for error detection. The second user is interested in the first message and the second message. System 100 can be configured to utilize modified CRC appending and detection to provide the second user with L3 bits CRC protection and to provide the first user with L2+L3 bits of CRC protection (a higher level of CRC protection). Further, this scheme can be implemented with low complexity. In accordance with some aspects, the scheme can be generalized to more than two messages.

Figure 2:
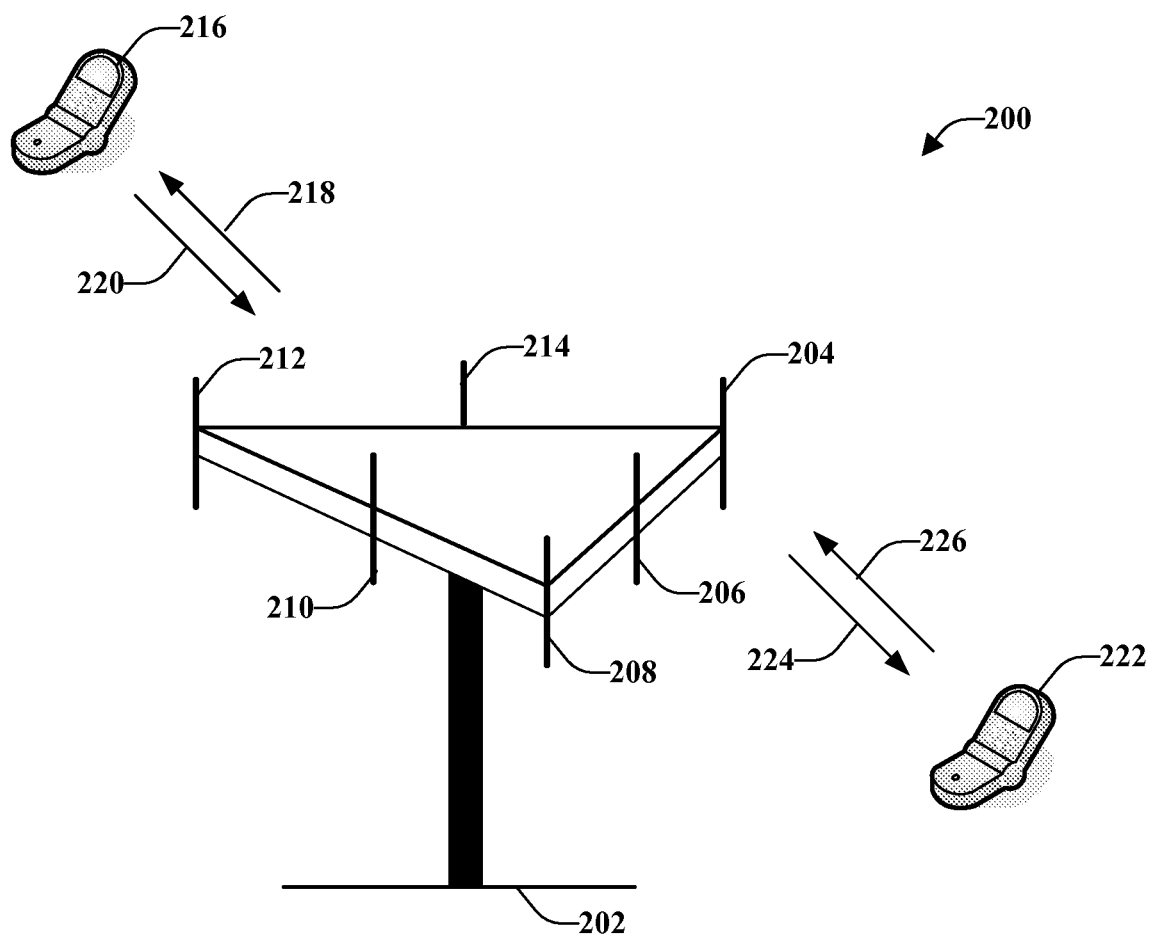
FIG. 2 illustrates a multiple access wireless communication system according to one or more aspects.

Referring now to FIG. 2, a multiple access wireless communication system 200 according to one or more aspects is illustrated. A wireless communication system 200 can include one or more base stations in contact with one or more devices. Each base station provides coverage for a plurality of sectors. A three-sector base station 202 is illustrated that includes multiple antenna groups, one including antennas 204 and 206, another including antennas 208 and 210, and a third including antennas 212 and 214. According to the figure, only two antennas are shown for each antenna group, however, more or fewer antennas may be utilized for each antenna group. Mobile device 216 is in communication with antennas 212 and 214, where antennas 212 and 214 transmit information to mobile device 216 over forward link 218 and receive information from mobile device 216 over reverse link 220. Forward link (or downlink) refers to the communication link from the base stations to mobile devices, and the reverse link (or uplink) refers to the communication link from mobile devices to the base stations. Mobile device 222 is in communication with antennas 204 and 206, where antennas 204 and 206 transmit information to mobile device 222 over forward link 224 and receive information from mobile device 222 over reverse link 226. In a FDD system, for example, communication links 218, 220, 224, and 226 might utilize different frequencies for communication. For example, forward link 218 might use a different frequency than the frequency utilized by reverse link 220.

Each group of antennas and/or the area in which they are designated to communicate may be referred to as a sector of base station 202. In one or more aspects, antenna groups each are designed to communicate to mobile devices in a sector or the areas covered by base station 202. A base station may be a fixed station used for communicating with the terminals.

In communication over forward links 218 and 224, the transmitting antennas of base station 202 can utilize beamforming in order to improve a signal-to-noise ratio of forward links for the different mobile devices 216 and 222. Also, a base station utilizing beamforming to transmit to mobile devices scattered randomly through its coverage area might cause less interference to mobile devices in neighboring cells than the interference that can be caused by a base station transmitting through a single antenna to all the mobile devices in its coverage area.

In accordance with some aspects, a hierarchical CRC encoding scheme can be utilized that can provide different protection levels to different users. For example, a message can include a first message and a second message. None of the users are aware of the first message. However, at least one user is aware of the second message and the other users are interested in receiving the second message. A user that knows both the first message and the second message can be provided a higher protection level than the protection level provided to the users that do not have a priori knowledge of the second message.

By way of example and not limitation, a message L1 can be an assignment message and L2 can be a MacID of a first receiving device for which the message is intended. The first receiving device can utilize the disclosed aspects to obtain L2+L3 bits worth of CRC protection. A second receiving device, in a second sector for example, might also wish to decode the assignment message in order to decode the message intended for the first receiving device. The second receiving device can cancel the interference caused by the transmission of that message. The second receiving device does not know the MacID, so the second receiving device gets L3 bits worth of CRC protection. For example, the second receiving device can try to read the assignment message in an attempt to discover the data channel transmission to the first device. The second receiving device then decodes the "data transmission" to the first device as indicated in the message and cancels the "data transmission".

Figure 3:
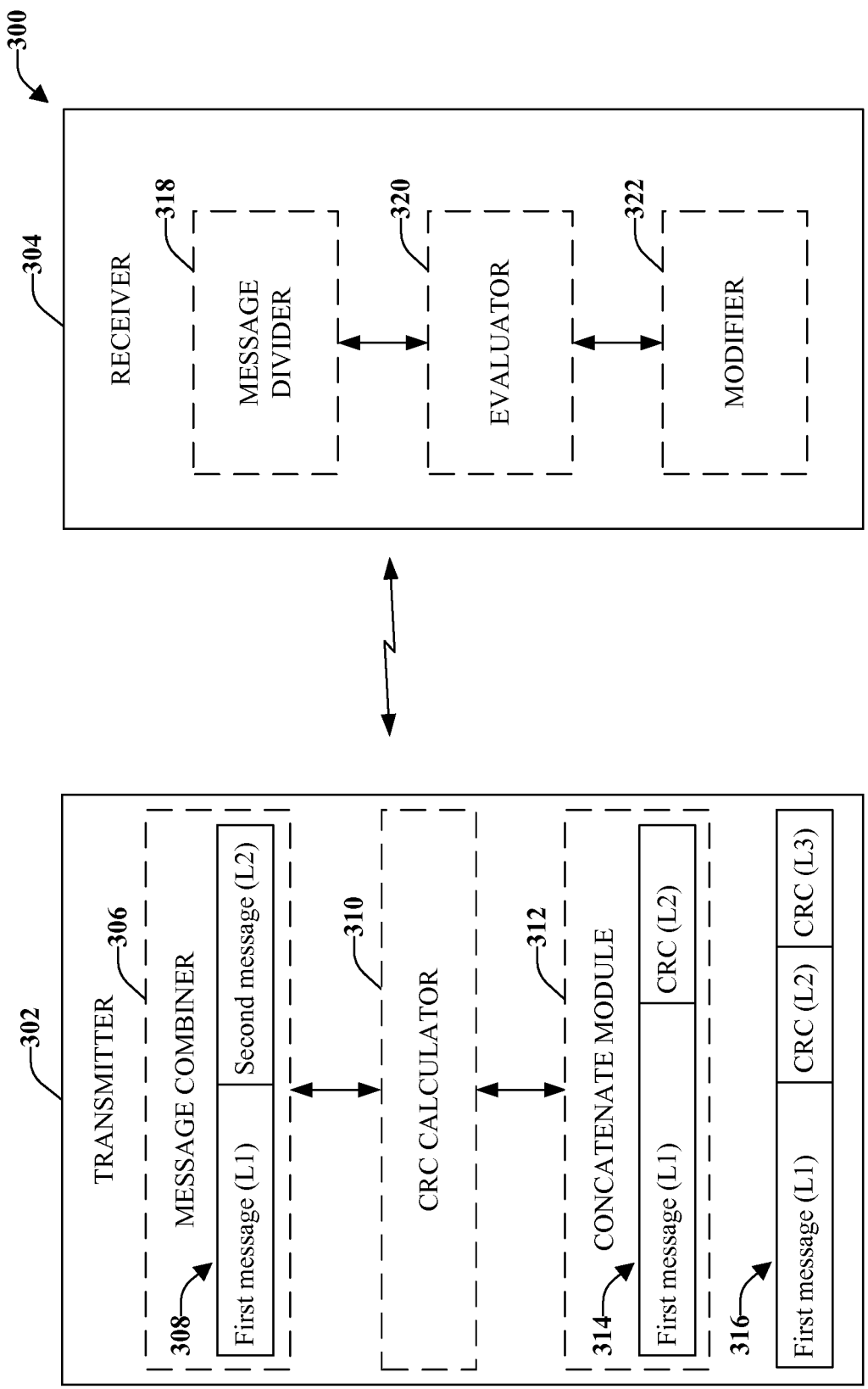
FIG. 3 illustrates a system for enabling a hierarchical CRC scheme in accordance with various aspects described herein.

FIG. 3 illustrates a system 300 for enabling a hierarchical CRC scheme in accordance with various aspects described herein. Included in system 300 is a transmitter 302 that is in communication with a receiver 304. Transmitter 302 and/or receiver 304 can be a base station, a mobile device, or other communication devices. Although a number of transmitter(s) 302 and receiver(s) 304 can be included in system 300, as will be appreciated, a single transmitter 302 that transmits communication data signals to a single receiver 304 is illustrated for purposes of simplicity.

Transmitter 302 can be configured to send a communication (e.g., data, message, and so forth) to two or more different receivers 304. In accordance with some aspects, each of the two or more different receivers 304 can have different requirements on false alarms. A false alarm can include receiving a message in error, receiving a message when a message was not transmitted, and so forth. Depending on the type of application utilized by receiver 304, a false alarm for some situations might not be necessary while low false alarms might be desired, depending on the importance of the message, for other situations.

Transmitter 302 includes a message combiner 306 that is configured to combine a first message and a second message into a single message. For purposes of this detailed description, the first message portion is referred to as L1 and the second message portion is referred to as L2. A representation of the combination of L1 bits first message with L2 bits second message is illustrated at 308.

Polynomial notation is a representation of a monomial (a real number or a variable) or the sum of two or more monomials. A polynomial is written in descending order by degree, wherein a degree is the exponent of the variable and the degree of the polynomial is the largest degree of any term in the polynomial. For example, a message comprising bits $b_0$, $b_1$, ..., $b_{N-1}$ can be written as the polynomial $b_0 + b_1 * x + b_2 * x^2 + b_{(N-1)} * x^{(N-1)}$. The combination of messages (first and second; common and private) in polynomial notation, where $a(x)$ represents the first message and $b(x)$ represents the second message, can be expressed as:

$$x^{L2}a(x)+b(x).$$

Also included in transmitter 302 is a CRC calculator 310 that is configured to calculate a CRC of the second message L2 from the combination of the second message portion and the first message portion. The CRC is utilized to verify the integrity of data. The transmitting device calculates the CRC value and appends the value to the data. The receiving device can perform a similar calculation and compare its result with the CRC value appended to the data. If there is a match, the transmission of the data is successful. If the calculated value and the CRC value appended to the data do not match, it indicates that there was a communication failure.

In accordance with some aspects, the CRC is calculated without appending zeros to the message. The CRC denoted by $c(x)$ can be represented by the following equation where $p_{L2}(x)$ is the CRC polynomial of length L2:

$$c(x)=[x^{L2}a(x)+b(x)] \bmod p_{L2}(x)$$

A concatenate module 312 is configured to concatenate L1 bits first message with L2 bits CRC (second message CRC). A representation of this concatenation is illustrated at 314. The concatenated version can be expressed as:

$$[x^{L2}a(x)+c(x)]$$

The CRC calculator 310 (or another component) can be configured to calculate L3 bits CRC from the concatenated message of the L1 bits first message and the L2 bits CRC. In accordance with some aspects, the L3 bits CRC can be calculated by appending L3 bits zeros first. The L3 bit CRC is denoted by $d(x)$ and can be expressed by the following where $P_{L3}(x)$ is the L3 bit CRC:

$$d(x)=[x^{L2+L3}a(x)+x^{L3}c(x)] \bmod p_{L3}(x)$$

A representation of the final transmitted message is illustrated at 316 and can be expressed as:

$$x^{L2+L3}a(x)+x^{L3}c(x)+d(x)$$

Receiver 304 is configured to receive the message from transmitter 302. Receiver 304 includes a message divider 318 that is configured to divide the entire received message by L3 bits CRC divisor. An evaluator 320 is configured to determine if the remainder is zero or is not zero. If the remainder is not zero, the transmission has failed. In accordance with some aspects, receiver 304 can request retransmission of the message if there is a failure in the transmission. In the absence of errors, the remainder should be zero as per the following equation:

$$d(x)=[x^{L2+L3}a(x)+x^{L3}c(x)] \bmod p_{L3}(x).$$

A modifier 322 is configured to remove the last L3 CRC bits. The message divider 318 (or another component) is configured to divide the remaining message by L2 bits CRC divisor. For a receiver 304 that does not know the second message (L2), the remainder is the second message. Since $[x^{L2}a(x)+b(x)] \bmod p_{L2}(x)=c(x)$, this results in $b(x)=[x^{L2}a(x)+c(x)] \bmod p_{L2}(x)$. A receiver 304 that knows both the first message and the second message compares the remainder with the true second message (known a priori by this device). If the remainder and the true second message are different, the transmission failed. If the remainder and the true second are the same, the transmission was successful.

Transmitter 302 and/or receiver 304 can be operatively connected to a memory and a processor that is configured to execute the instructions retained in the memory. Memory associated with transmitter 302 is configured to retain instructions related to combining a first message and a second message and applying a CRC encoding scheme that provides different protection levels based on knowledge of the second message. Memory of receiver 304 is configured to retain instructions related to receiving a combined message that includes a first message and a second message and performing a CRC check to ascertain if the message transmission was successful.

Figure 4:
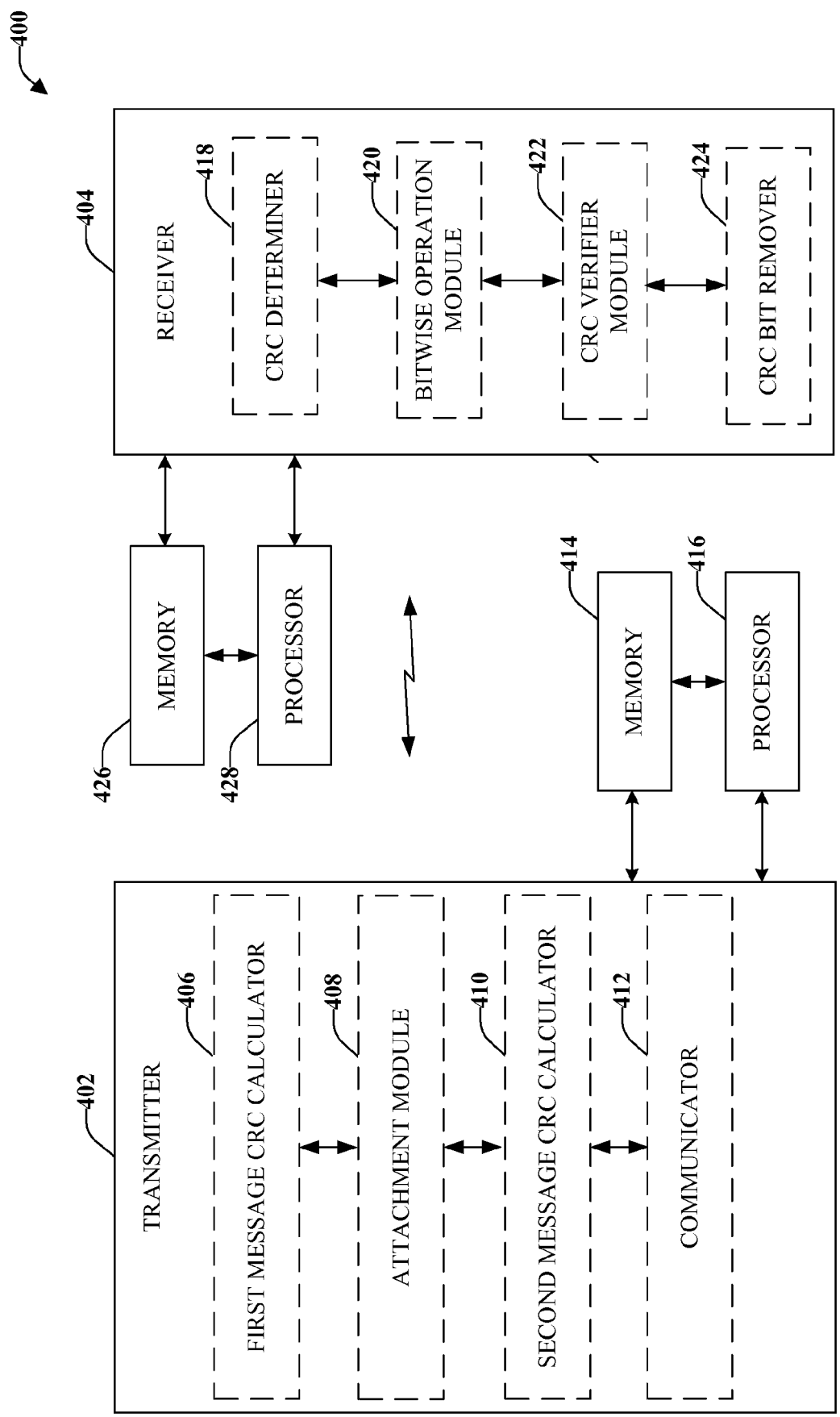
FIG. 4 illustrates another system for utilization of a hierarchical CRC scheme in accordance with the disclosed aspects.

FIG. 4 illustrates another system 400 for utilization of a hierarchical CRC scheme in accordance with the disclosed aspects. System 400 is similar to the system of the above figure and includes one or more transmitters 402 and one or more receivers 404. The transmitter 402 and/or receiver 404 can be a mobile device, a base station, or another communication device. For example, transmitter 402 can be a base station and receiver 404 can be a user device. In another example, both transmitter 402 and receiver 404 can be mobile devices. In a further example, transmitter 402 can be a mobile device and receiver 404 can be a base station, and so forth.

Figure 5:
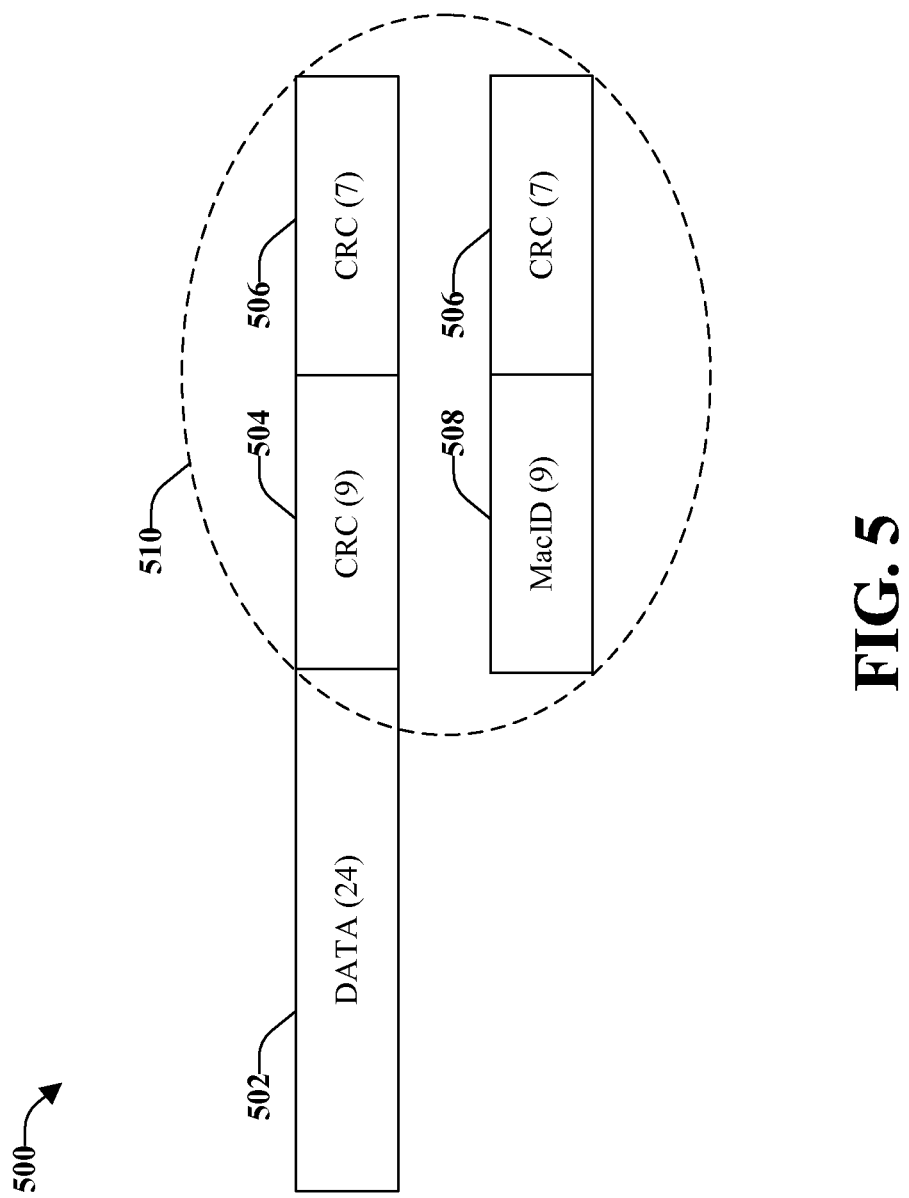
FIG. 5 illustrates a schematic representation of a CRC scheme according to one or more of the disclosed aspects.

Transmitter 402 is configured to append a CRC to a combined message that includes a first message (L1) and a second message (L2). A first message CRC calculator 406 is configured to calculate L2 and L3 bits of CRC for the first message. An attachment module 408 is configured to append the L2 and L3 bits of CRC to the message. This is shown in FIG. 5, which illustrates a schematic representation of a CRC scheme 500 according to one or more of the disclosed aspects. It should be noted that although the disclosed aspects are described with reference to two messages, the disclosed aspects are not so limited and more than two messages can be utilized with the various aspects disclosed herein.

A first message is illustrated at 502. The first message 502 can include data or other information, which is not known by the receiving devices. The illustrated first message has twenty-four bits of data, however, the disclosed aspects are not so limited and any number of bits can be utilized. Illustrated, at 504, is the CRC L2 appended to the first message 502. The CRC L2 (504) can be nine bits (or any other number of bits) in length. A CRC L3 is illustrated, at 506, and is appended to the message. The CRC 3 (506) can be seven bits (or any other number of bits) in length.

Also included in transmitter 402 of FIG. 4 is a second message CRC calculator 410 that is configured to calculate L3 bits of CRC for the second message. Attachment module 408 (or another component) can append the L3 bits of CRC to the message. In accordance with some aspects, first message CRC calculator 406 and second message CRC calculator 410 can be included in a single module. A second message, such as a MacID, is illustrated in FIG. 5 at 508. The second message can be known a priori by one of the devices. The second message 508 can be any length. The illustrated second message has a length of nine bits. Appended to the second message 508 is the CRC L3 (506).

A communicator 412 (of FIG. 4) can be configured to transmit the message. The transmitted message can be a bitwise exclusive OR (XOR) operation of the results of the calculated CRC bits for the first message and the calculated CRC bits for the second message, with the rightmost bit alignment.

The bitwise exclusive OR (XOR) operation is performed on the portions included in the dashed circle 510 of FIG. 5. For example, a bitwise XOR is performed on the CRC L2 (504) and the CRC L3 (506) pair and the second message 508 and CRC L3 (506) pair. The result of the bitwise XOR operation is transmitted to the receiver.

With further reference to FIG. 4, a memory 414 can be operatively coupled to transmitter 402 (or transmitter 302 of FIG. 3). Memory 414 can be external to transmitter 402 or can reside within transmitter 402. Memory 414 can store information related to providing a hierarchical CRC scheme as disclosed herein. A processor 416 can be operatively connected to transmitter 402 (and/or memory 414) to facilitate analysis of information related to a hierarchical CRC scheme in a communication network. Processor 416 can be a processor dedicated to analyzing and/or generating information received by transmitter 402, a processor that controls one or more components of system 400, and/or a processor that both analyzes and generates information received by transmitter 402 and controls one or more components of system 400.

The receiver 404 can include a CRC determiner 418 that is configured to calculate L2 and L3 bits of CRC for the first message portion of the received message. A bitwise operation module 420 can be configured to perform a bitwise XOR operation on the calculated L2 and L3 bits and the last L2 and L3 bits of the received message.

Also included in receiver 404 is a CRC verification module 422 that is configured to verify the result for a CRC check of the L3 bits. If the check fails, the transmission has failed and no further action is taken (or a retransmission request can be sent). If the check is successful, the last L3 CRC bits are removed by a CRC bit remover 424.

If the receiver 404 is not aware of the second message, the remaining message is the second message and no further action is taken. If the receiver 404 is aware of the second message (e.g., has a priori knowledge of the second message), the remaining message is compared with the true second message (e.g., the a priori known message). If the remaining message and the true second message are different, the transmission failed and no further action is taken (or a retransmission request can be sent). If the remaining message and the true second message are the same, the transmission is successful.

Receiver 404 can include memory 426 operatively coupled to receiver 404 (or receiver 304 of FIG. 3). Memory 426 can be external to receiver 404 or can reside within receiver 404. Memory 426 can store information related to receiving a combined message that includes a first message and a second message. Memory 426 can also store information related to performing a CRC check on at least the first message to ascertain if the message transmission was successful.

A processor 428 can be operatively connected to receiver 404 (and/or memory 426) to facilitate analysis of information related to decoding a hierarchical CRC scheme and error detection in a communication network. Processor 428 can be a processor dedicated to analyzing and/or generating information received by receiver 404, a processor that controls one or more components of system 400, and/or a processor that both analyzes and generates information received by receiver 404 and controls one or more components of system 400.

It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
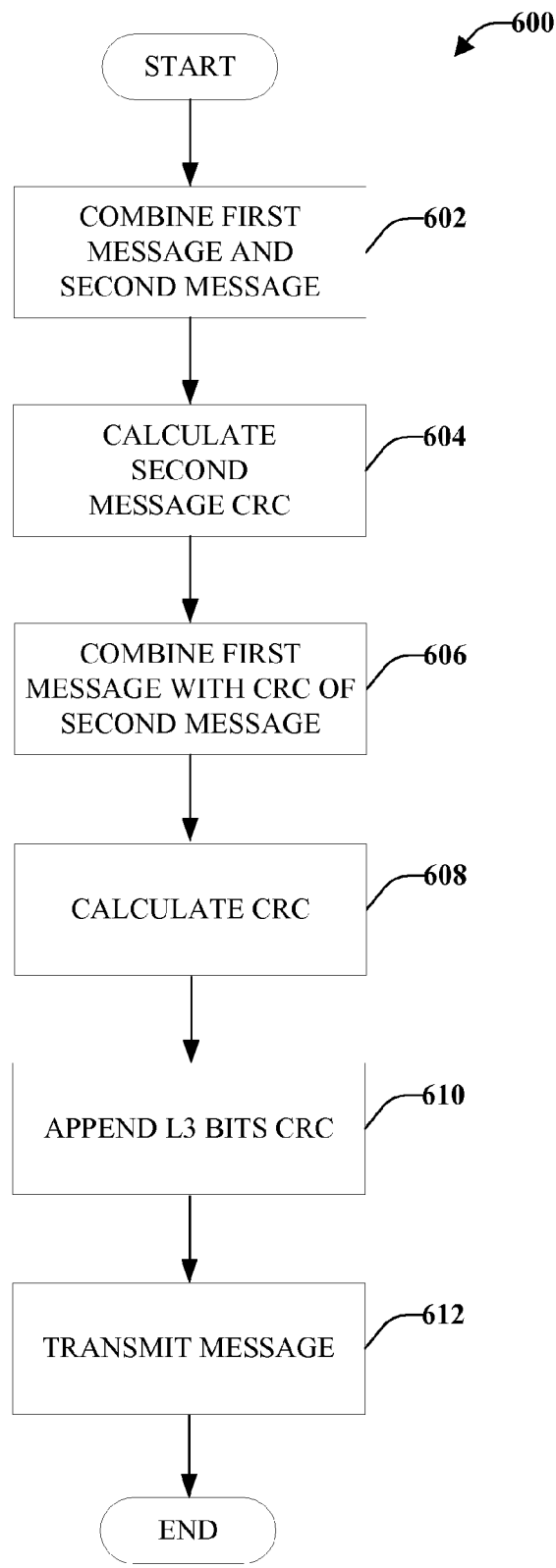
FIG. 6 illustrates a method for appending a CRC to a message for transmission to multiple devices according to an aspect.

FIG. 6 illustrates a method 600 for appending a CRC to a message for transmission to multiple devices according to an aspect. Method 600 enables a CRC encoding scheme that provides different protection levels to users. For example, users that are aware of a portion of a message can be provided a higher level of protection than users that are not aware of that portion of the message.

Method 600 starts at 602, when bits of a first message (referred to as L1 bits) are concatenated with bits of a second message (referred to as L2 bits) to obtain a first concatenated message. Each of the messages (first message and second message) can be expressed as polynomials. In polynomial notation, let a(x) be the first message and b(x) be the second message. Thus, the concatenated version is $x^{L2}a(x)+b(x)$.

At 604, L2 bits (first message bits) CRC is calculated from the first concatenated message. In accordance with some aspects, the L2 bits CRC is calculated without appending zeros to the message. The CRC, referred to as c(x) is equal to $[x^{L2}a(x)+b(x)]$ mod $P_{L2}(x)$, where $P_{L2}$ is the CRC polynomial of length L2.

The L1 bits of the first message are concatenated with L2 bits CRC, at 606 to obtain a second concatenated message. The concatenated version is $[x^{L2}a(x)+c(x)]$. At 608, L3 bits CRC from the second concatenated message is calculated. The L3 bits CRC are appended to the second concatenated message, at 610, to obtain a transmitted message, which is sent at 612. In accordance with some aspects, at least one zero is appended before the L3 bits CRC are appended to the second concatenated message.

The final transmitted message is the combination of the first message (L1), the CRC (L2), and the CRC (L3). The L3 bit CRC can be expressed as: $d(x)=[x^{L2+L3}a(x)+x^{L3}c(x)]$ mod $p_{L3}(x)$, where $p_{L3}(x)$ is the L3 bit CRC.

The message is transmitted to two or more receivers, at 610. At least one of the receivers to which the message is transmitted might be aware of the second message. The transmitted message can be expressed as: $x^{L2+L3}a(x)+x^{L3}c(x)+d(x)$.

Figure 7:
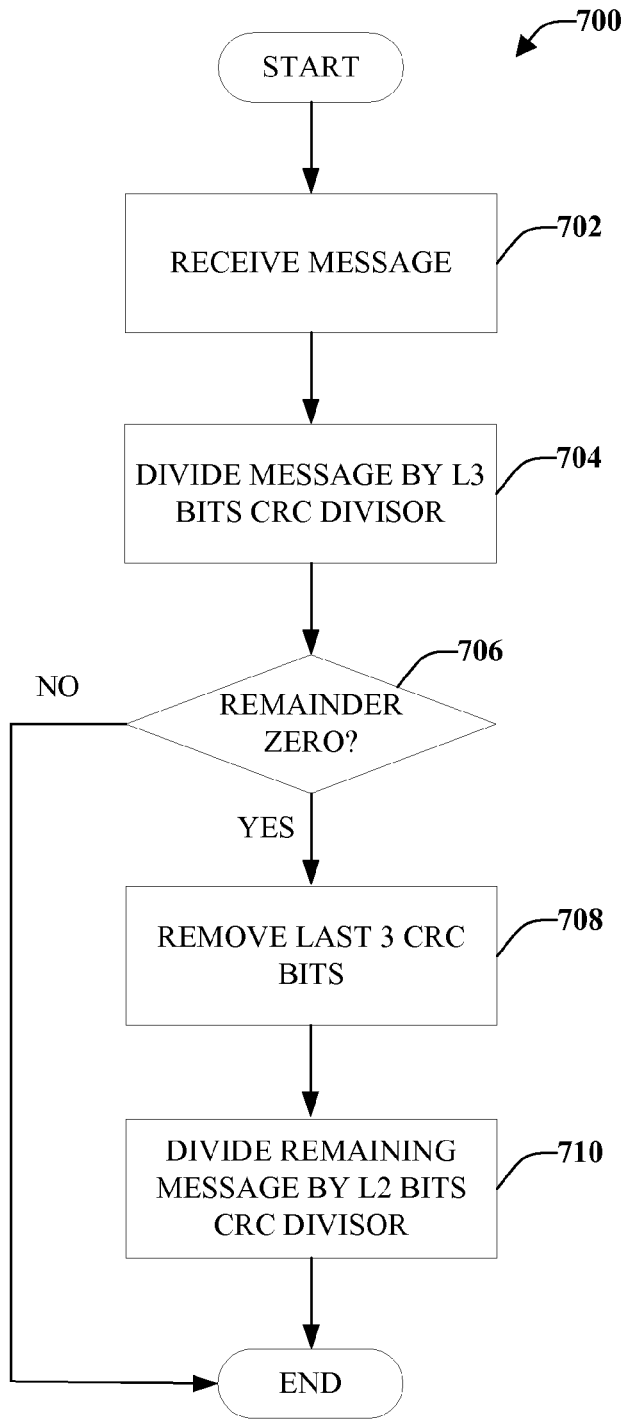
FIG. 7 illustrates a method for receiving a message that is encoded with a hierarchical CRC scheme in accordance with an aspect.

FIG. 7 illustrates a method 700 for receiving a message that is encoded with a hierarchical CRC scheme in accordance with an aspect. The message can be intended for two or more device users and can provide a different encoding scheme for the users as a function of whether a user is aware of a second portion of the message (e.g. a private portion of the message).

A message is received, at 702. This message can include a first message portion and a second message portion. The first message portion can be unknown to all receiving devices. For example, the first message can be an assignment message. The second message portion is known a priori by at least one mobile device. As an example, the second message can include a device identifier. The other devices that do not have a priori knowledge of the second message are interested in receiving the second message.

At 704, the message is divided by L3 bits CRC divisor. A determination is made, at 706, whether the remainder is zero. If the remainder is not zero ("NO"), the transmission failed and method 700 ends. In accordance with some aspects, a retransmission request can be transmitted for the message to be resent.

If the remainder is zero ("YES"), method 700, continues, at 708 where the last L3 bits are removed. The remaining message is divided, at 710, by L2 bits CRC divisor. For a user that is not aware of the second (e.g., private) message, the remainder is the second message, which is not useful for extra CRC protection for this user. For the user that is aware of the second message, the remainder is compared with the true second message. If the remainder and the true second message are different, the transmission failed. In this situation, the message can be ignored and/or a retransmission request can be sent to the transmitting device. If the remainder and the true second message are the same, the transmission was successful.

Figure 8:
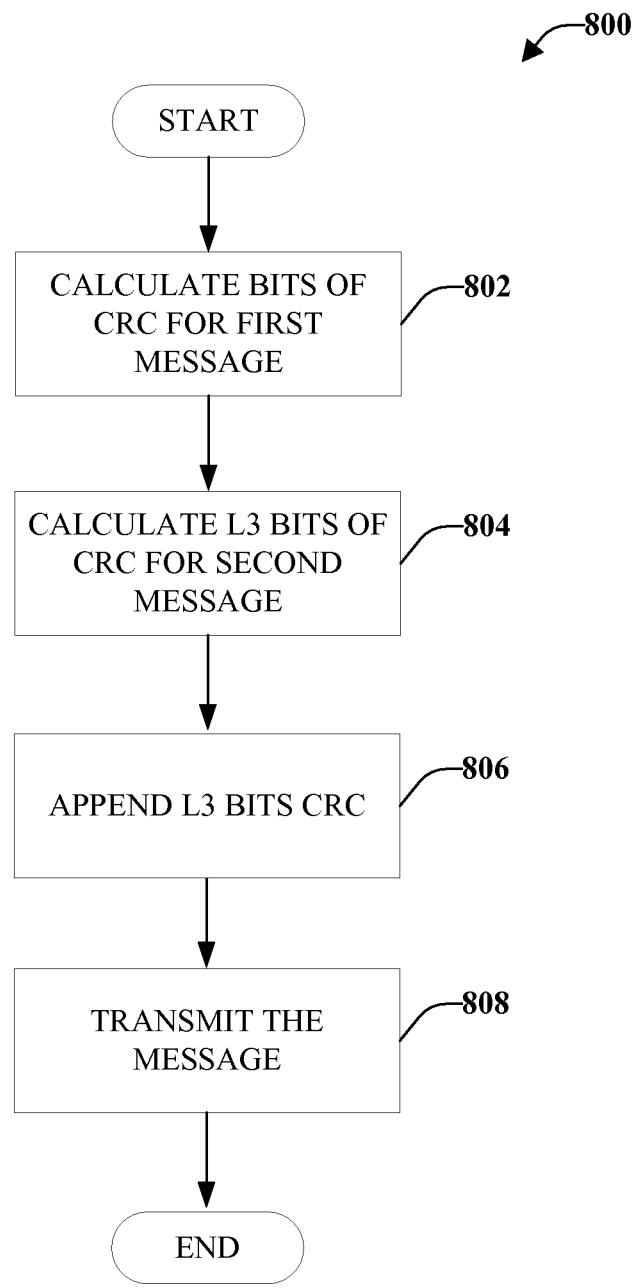
FIG. 8 illustrates a method for hierarchical CRC appending of a message according to an aspect.

With reference now to FIG. 8, illustrated is a method 800 for hierarchical CRC appending of a message according to an aspect. Method 800 can create data with a CRC and a user that knows the data can utilize the data as part of the CRC. A user that does not know a second portion of the data (e.g., private message portion) is provide with weaker CRC protection, but is able to obtain the data.

Method 800 starts, at 802, when (L2+L3) bits of CRC for a first message are calculated. The (L2+L3) bits of CRC are appended to a first message, at 804, to obtain a first result. At 806, L3 bits of CRC for a second message are calculated. The calculated L3 bits of CRC are appended to the second message, at 808, to obtain a second result.

The message is transmitted, at 808. The transmission can be the bitwise exclusive OR (XOR) operation of the first results and the second result, with the rightmost bit alignment to obtain the combined message. The transmitted combined message includes a first message and a second message. The first message is not known by the devices a priori and the second message is known a priori by one of the devices.

Figure 9:
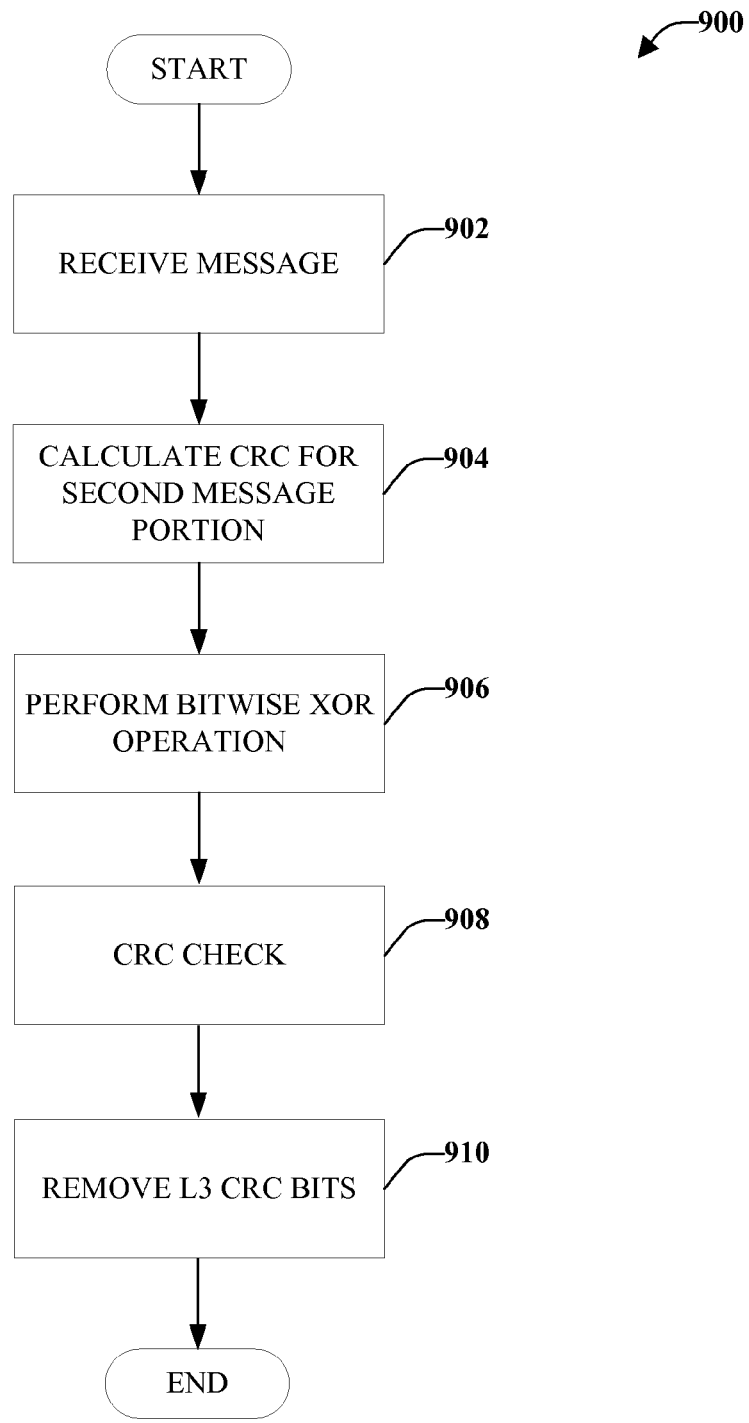
FIG. 9 illustrates a method for checking the CRC of a received message according to an aspect.

FIG. 9 illustrates a method 900 for checking the CRC of a received message according to an aspect. The received message can include a first message not known to the multiple users and a second message known a priori by one of the multiple users. For example, the first message can be an assignment message, such as a base station indicating to a mobile device the bandwidth that is available for the mobile device (e.g., User_ID_1 has bandwidth starting at a certain point.) The second message can be a MAC ID, such as an identifier of a first base station. The first base station is aware of its own MAC ID and can utilize that information to receive two bits (L1 and L2) of CRC protection. A second base station might desire to decode the first message (e.g., assignment message) sent to the first base station. The second base station does not know to what device the assignment message is addressed, and thus is provided less protection but can receive the information about the message (e.g., the assignment message).

Method 900 starts, at 902, when L2 and L3 bits of CRC for a received message are calculated. The L2 and L3 bits are calculated for the first portion of the message. At 904, a bitwise XOR operation of the result is performed on the last L2 and L3 bits of the received message.

The result for L3 bit CRC check is sent. If the CRC check fails, the transmission failed and method 900 ends. In accordance with some aspects, a retransmission request can be sent for the message to be retransmitted.

If the CRC check is successful, the last L3 CRC bits are removed, at 908. For a user that does not have a priori knowledge of the second message, the remaining message is the second message and is ignored. For a user that has a priori knowledge of the second message, the remaining message is compared with the true (e.g., already known) second message. If the remaining message and the true second message are different, the transmission failed. In this situation, the message can be ignored and/or a retransmission request can be sent to the transmitting device. If the remaining message and the true second message are the same, it indicates that the transmission is successful.

Figure 10:
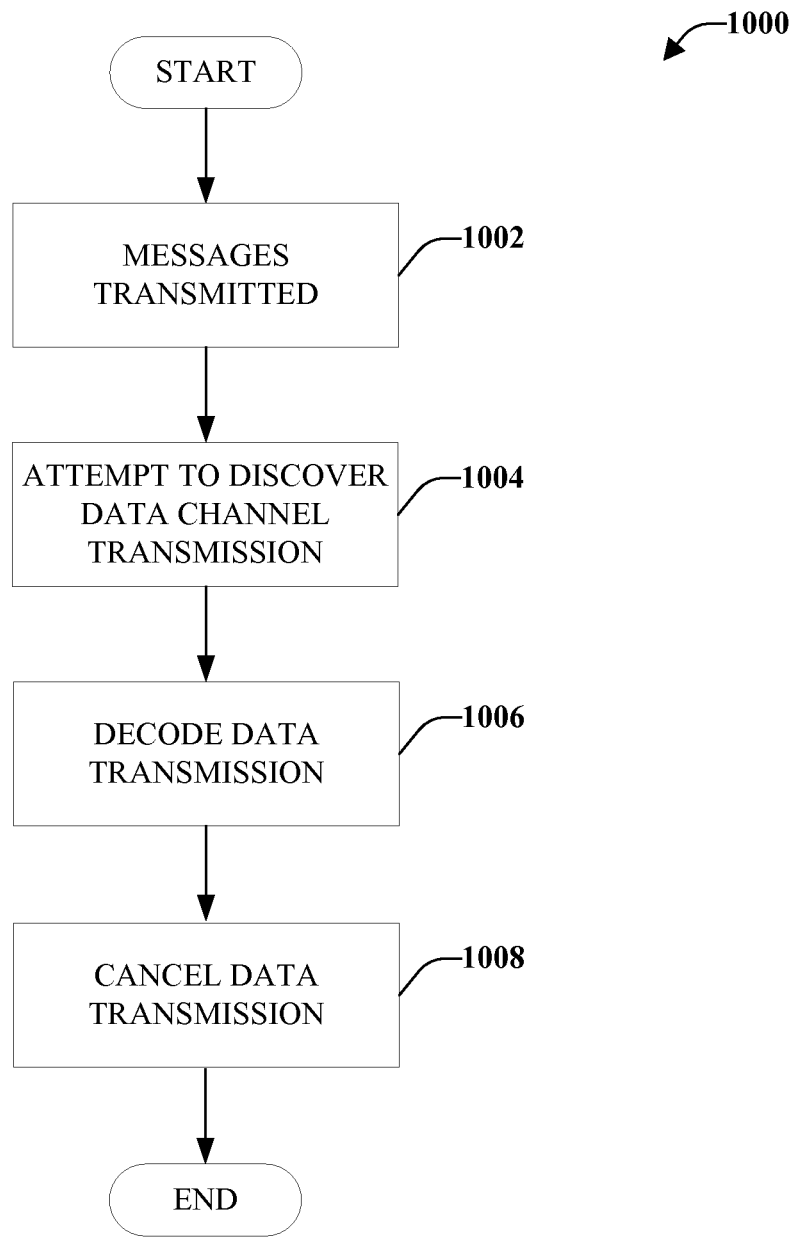
FIG. 10 illustrates a method for a hierarchical CRC encoding scheme in accordance with one or more of the disclosed aspects.

FIG. 10 illustrates a method 1000 for a hierarchical CRC encoding scheme in accordance with one or more of the disclosed aspects. Method starts, at 1002, when a first message and a second message are transmitted to one or more devices. The one or more devices are not aware of the first message. However, one of the devices (referred to as the first device) is aware (e.g., has a priori knowledge) of the second message. The first device (that is aware of the second message) receives a higher level of protection than the other devices. The first and second messages comprise an assignment message.

The other devices that are not aware of the second message can be interested in receiving the second message. Thus, method 1000 continues, at 1004 where one or more of the other devices attempts to discover the data channel transmission to the first device by attempting to receive the second message (sent to the first device). At 1006, the data channel transmission corresponding to the assignment message is decoded as indicated in the message. The "data transmission" (not the message itself) is canceled, at 1008. The one or more other devices receive a lower protection level than the first device.

Figure 11:
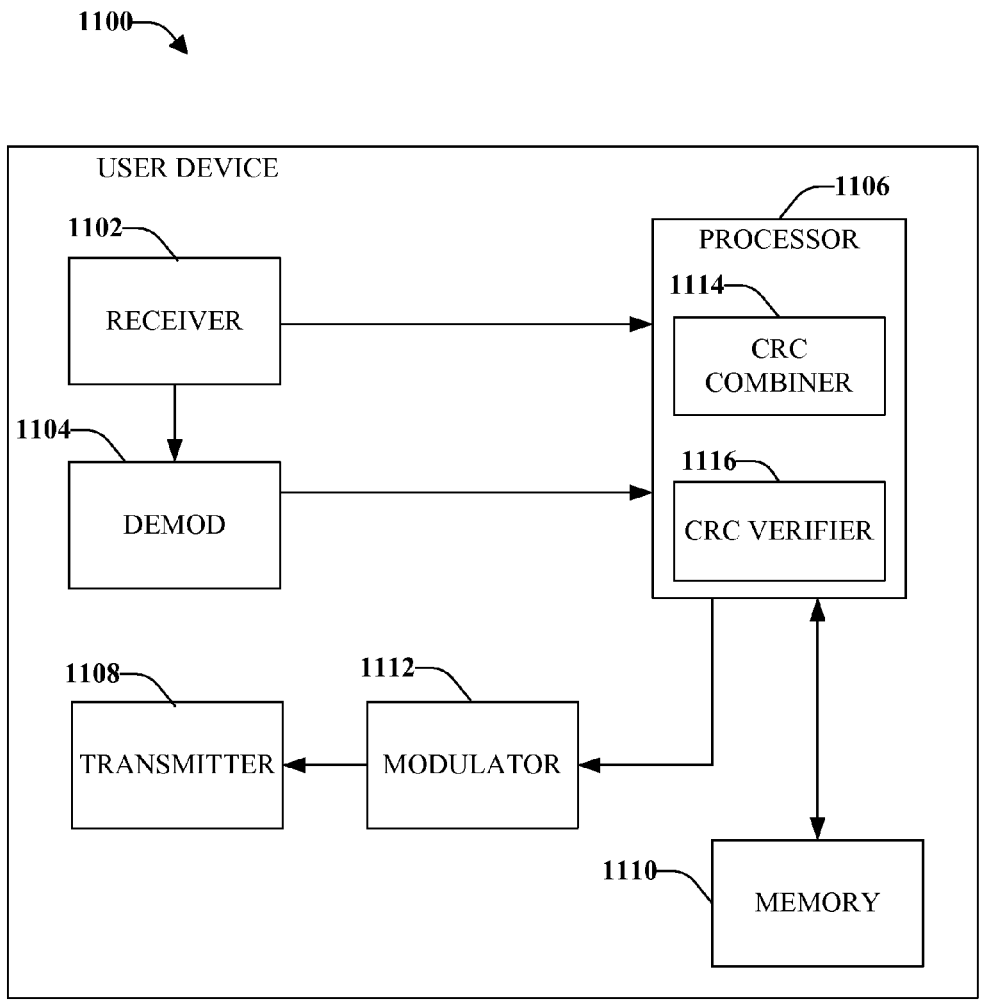
FIG. 11 illustrates a system that facilitates a hierarchical CRC scheme in accordance with one or more of the disclosed aspects.

With reference now to FIG. 11, illustrated is a system 1100 that facilitates a hierarchical CRC scheme in accordance with one or more of the disclosed aspects. System 1100 can reside in a user device. System 1100 comprises a receiver 1102 that can receive a signal from, for example, a receiver antenna. The receiver 1102 can perform typical actions thereon, such as filtering, amplifying, downconverting, etc. the received signal. The receiver 1102 can also digitize the conditioned signal to obtain samples. A demodulator 1104 can obtain received symbols for each symbol period, as well as provide received symbols to a processor 1106.

Processor 1106 can be a processor dedicated to analyzing information received by receiver component 1102 and/or generating information for transmission by a transmitter 1108. In addition or alternatively, processor 1106 can control one or more components of user device 1100, analyze information received by receiver 1102, generate information for transmission by transmitter 1108, and/or control one or more components of user device 1100. Processor 1106 can include a controller component capable of coordinating communications with additional user devices.

User device 1100 can additionally comprise memory 1108 operatively coupled to processor 1106 and that can store information related to coordinating communications and any other suitable information. Memory 1110 can additionally store protocols associated with CRC combining and CRC verifying in accordance with the disclosed aspects. User device 900 can further comprise a symbol modulator 1112 and a transmitter 1108 that transmits the modulated signal.

Processor 1106 can be operatively associated with a CRC combiner 1114 that is configured to combine a first message and a second message and one or more CRC bits into a combined message. The combined message can be transmitted to one or more other devices (e.g., a base station, a node, another communication device, and so forth). Processor 1106 is also operatively associated with a CRC verifier 1116 that is configured to check one or more CRCs included in a received message. The received message can be a combined message (that includes a first message and a second message) received from another device.

Figure 12:
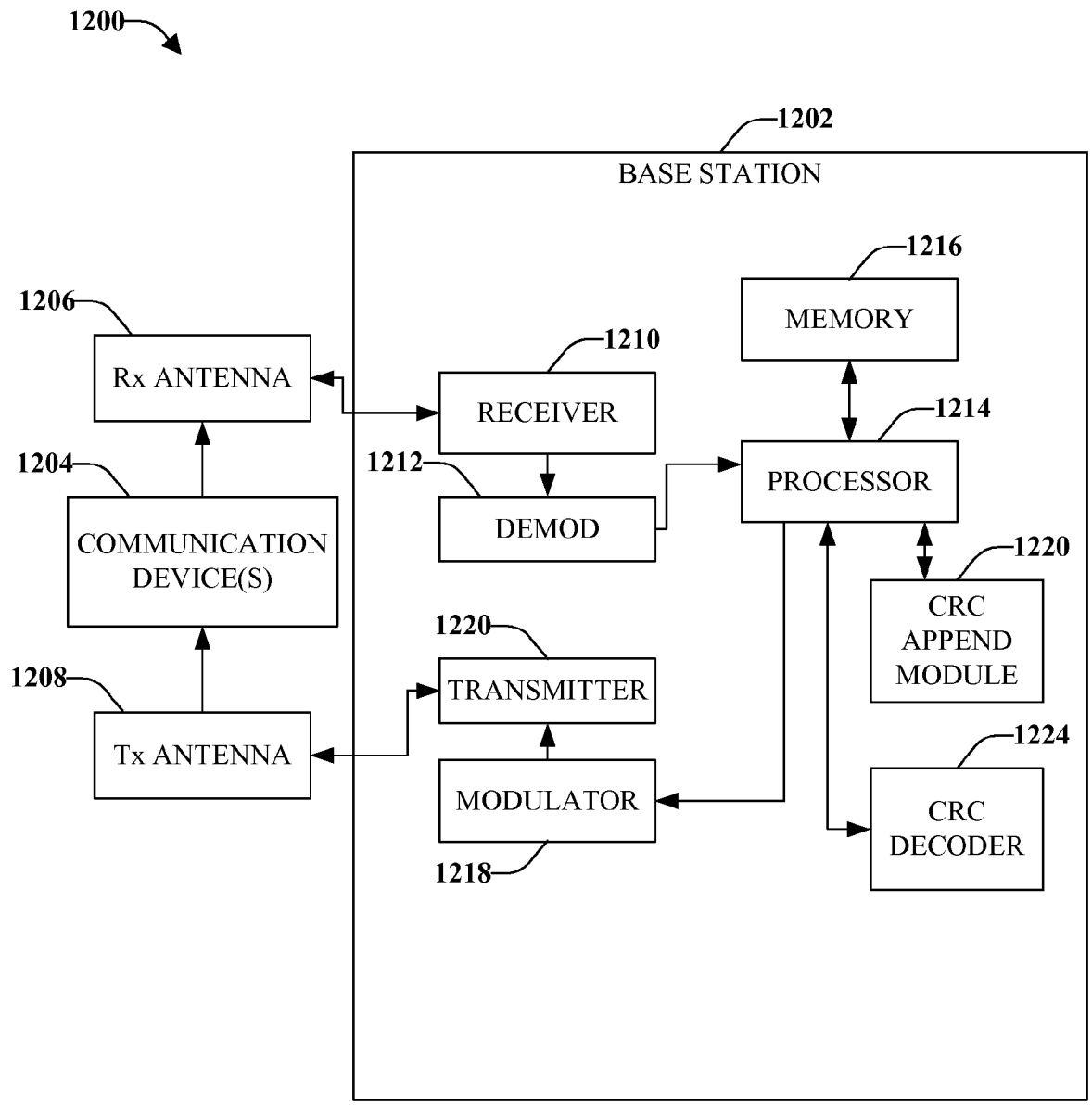
FIG. 12 illustrates a system that facilitates a hierarchical CRC scheme in accordance with various aspects presented herein.

FIG. 12 is an illustration of a system 1200 that facilitates a hierarchical CRC scheme in accordance with various aspects presented herein. System 1200 comprises a base station or access point 1202. As illustrated, base station 1202 receives signal(s) from one or more communicate devices 1204 (e.g., user device, base station, and so forth) by a receive antenna 1206, and transmits to the one or more communication devices 1204 through a transmit antenna 1208.

Base station 1202 comprises a receiver 1210 that receives information from receive antenna 1206 and is operatively associated with a demodulator 1212 that demodulates received information. Demodulated symbols are analyzed by a processor 1214 that is coupled to a memory 1216 that stores information related to CRC appending and detection. A modulator 1218 can multiplex the signal for transmission by a transmitter 1220 through transmit antenna 1208 to communication devices 1204.

Processor 1214 is further coupled to a CRC append module 1222 that is configured to combine a first message and a second message into a combined message. The combined message also includes one or more CRC bits derived from the first message and/or the second message. The combined message can be transmitted to one or more other devices (e.g., communication device 1104). Processor 1214 is also coupled to a CRC decoder 1224 that is configured to decode and verify one or more CRCs included in a message received from one or more communication device 1004. The received message can be a combined message (that includes a first message and a second message).

Figure 13:
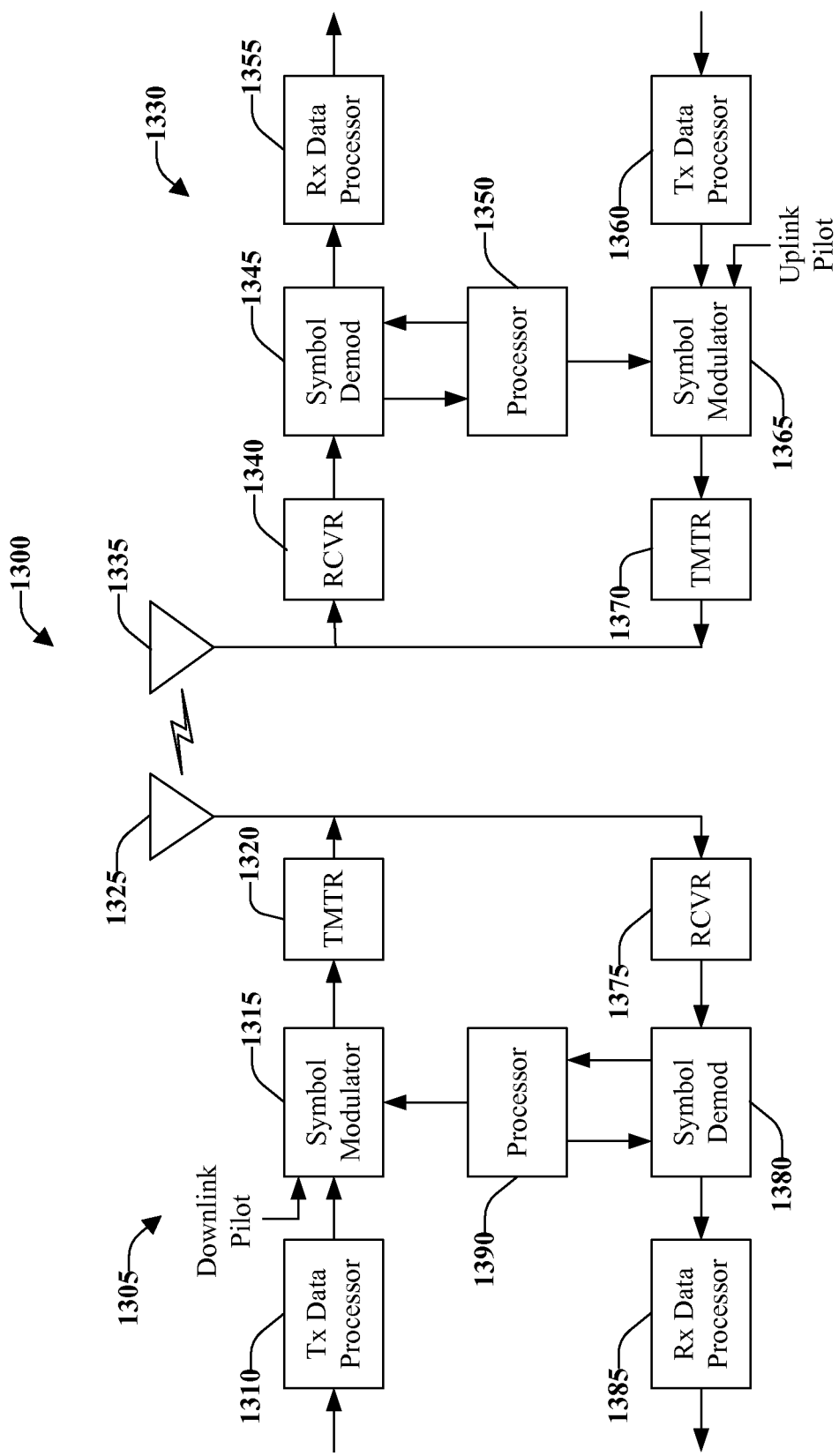
FIG. 13 illustrates an example wireless communication system in accordance with an aspect.

FIG. 13 illustrates an example wireless communication system 1300 in accordance with an aspect. Wireless communication system 1300 depicts one base station and one terminal for sake of brevity. However, it is to be appreciated that system 1300 can include more than one base station or access point and/or more than one terminal or user device, wherein additional base stations and/or terminals can be substantially similar or different from the example base station and terminal illustrated and described below. In addition, it is to be appreciated that the base station and/or the terminal can employ the systems and/or methods described herein to facilitate wireless communication there between.

On a downlink, at access point 1305, a transmit (TX) data processor 1310 receives, formats, codes, interleaves, and modulates (or symbol maps) traffic data and provides modulation symbols ("data symbols"). A symbol modulator 1315 receives and processes the data symbols and pilot symbols and provides a stream of symbols. A symbol modulator 1315 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1320 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1325 to the terminals. At terminal 1330, an antenna 1335 receives the downlink signal and provides a received signal to a receiver unit (RCVR) 1340. Receiver unit 1340 conditions (e.g., filters, amplifies, and frequency downconverts) the received signal and digitizes the conditioned signal to obtain samples. A symbol demodulator 1345 obtains N received symbols and provides received pilot symbols to a processor 1350 for channel estimation. Symbol demodulator 1345 further receives a frequency response estimate for the downlink from processor 1350 and performs data demodulation on the received data symbols to obtain data symbol estimates (which are estimates of the transmitted data symbols). Further symbol demodulator 1345 can provide the data symbol estimates to an RX data processor 1355, which demodulates (i.e., symbol demaps), deinterleaves, and decodes the data symbol estimates to recover the transmitted traffic data. The processing by symbol demodulator 1345 and RX data processor 1355 is complementary to the processing by symbol modulator 1315 and TX data processor 1310, respectively, at access point 1305.

On the uplink, a TX data processor 1360 processes traffic data and provides data symbols. A symbol modulator 1365 receives and multiplexes the data symbols with pilot symbols, performs modulation, and provides a stream of symbols. A transmitter unit 1370 receives and processes the stream of symbols to generate an uplink signal, which is transmitted by the antenna 1335 to the access point 1305.

At access point 1305, the uplink signal from terminal 1330 is received by the antenna 1325 and processed by a receiver unit 1375 to obtain samples. A symbol demodulator 1380 processes the samples and provides received pilot symbols and data symbol estimates for the uplink. An RX data processor 1385 processes the data symbol estimates to recover the traffic data transmitted by terminal 1330. A processor 1390 performs channel estimation for each active terminal transmitting on the uplink.

Processors 1390 and 1350 direct (e.g., control, coordinate, manage, and so forth) operation at access point 1305 and terminal 1330, respectively. Respective processors 1390 and 1350 can be associated with memory units (not shown) that store program codes and data. Processors 1390 and 1350 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal.

Figure 14:
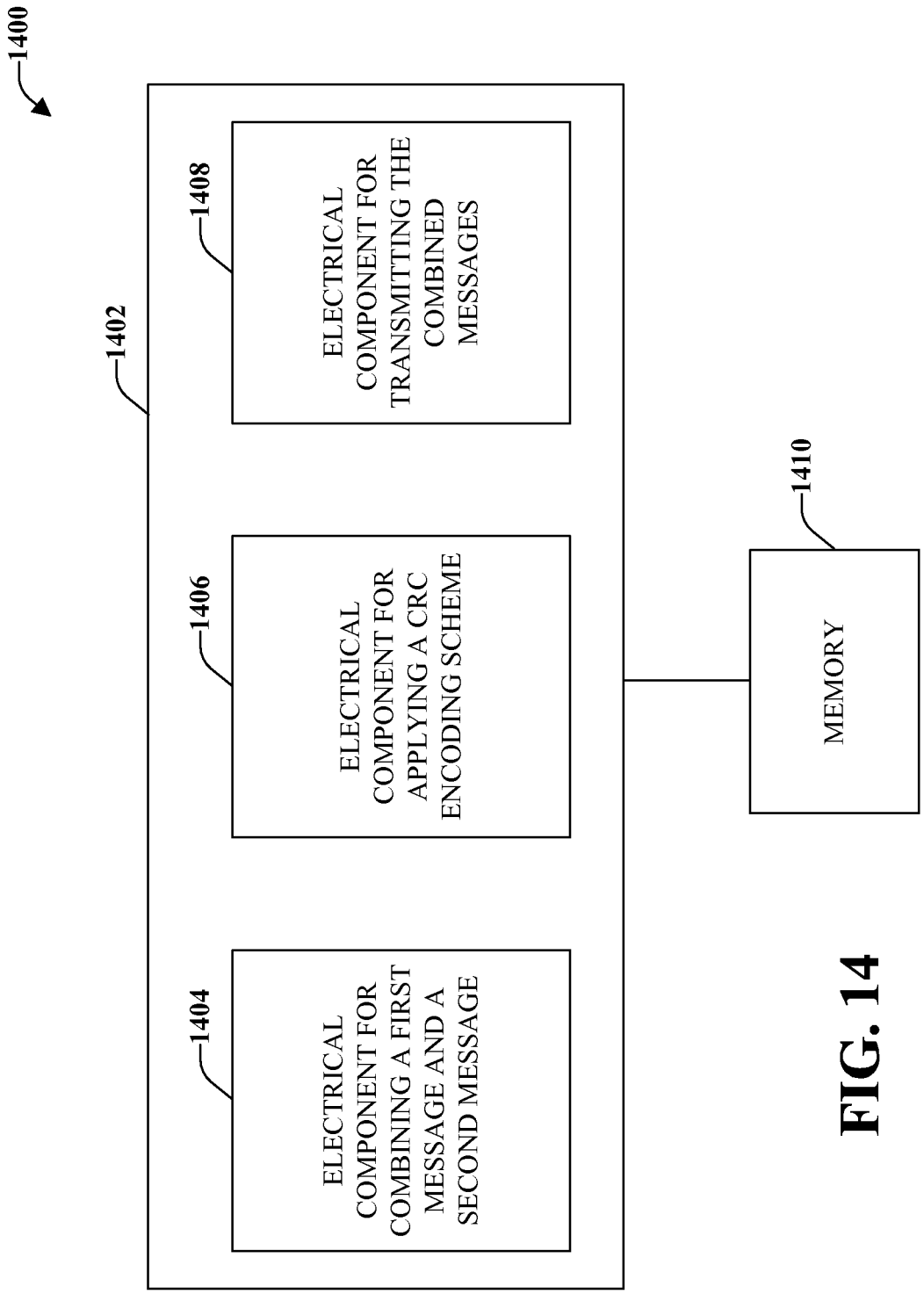
FIG. 14 illustrates an example system that enables hierarchical cyclic redundancy check (CRC) protection in a communication environment according to an aspect.

With reference to FIG. 14, illustrated is an example system 1400 that enables hierarchical cyclic redundancy check (CRC) protection in a communication environment according to an aspect. System 1400 is represented as including functional blocks, which can be functional blocks that represent functions implemented by a processor, software, or combination thereof (e.g., firmware).

System 1400 includes a logical grouping 1402 of electrical components that can act separately or in conjunction. Logical grouping 1402 can include an electrical component 1404 for combining a first message and a second message. The first message can be unknown a priori by a plurality of devices and the second message can be known a priori by a single device. Also included in logical grouping 1402 is an electrical component 1406 for applying a CRC encoding scheme to the combined messages. The CRC encoding scheme can provide different protection levels based on knowledge of the second message. For example, a device that is not aware of the second message receives a lower level of CRC protection than a device that is aware of the second message a priori. Logical grouping 1402 also includes an electrical component 1408 for transmitting the combined first message and second message with the applied CRC encoding scheme.

In accordance with some aspects, logical grouping 1402 can include an electrical component for combining L1 bits of the first message with L2 bits of the second message to obtain a first combined message. Also included can be an electrical component for calculating L2 bits CRC from the first combined message and an electrical component for concatenating the L1 bits of the first message with the L2 bits CRC to obtain a second combined message. The first combined message can be obtained without appending one or more zeros to the first combined message. Further, logical grouping 1402 can include an electrical component for calculating L3 bits CRC from the second combined message and an electrical component for appending the L3 bits CRC to the second combined message to obtain a transmitted message. At least one zero can be appended before the L3 bits CRC are appended to the second combined message. L1, L2, and L3 are integers.

According to some aspects, logical grouping 1402 includes an electrical component for calculating (L2+L3) bits of CRC for a first message and an electrical component for appending the (L2+L3) bits of CRC to the first message to obtain a first result. Also included can be an electrical component for calculating L3 bits of CRC for the second message and an electrical component for appending the L3 bits of CRC for the second message to obtain a second result. The electrical component for appending the L3 bits of CRC for the second message can further perform a bitwise XOR operation of the first result and the second result with a rightmost bit alignment to obtain the combined message. Logical grouping 1402 can also include an electrical component for transmitting the combined message.

Additionally, system 1400 can include a memory 1410 that retains instructions for executing functions associated with electrical components 1404, 1406, and 1408 or other components. While shown as being external to memory 1410, it is to be understood that one or more of electrical components 1404, 1406, and 1408 can exist within memory 1410.

Figure 15:
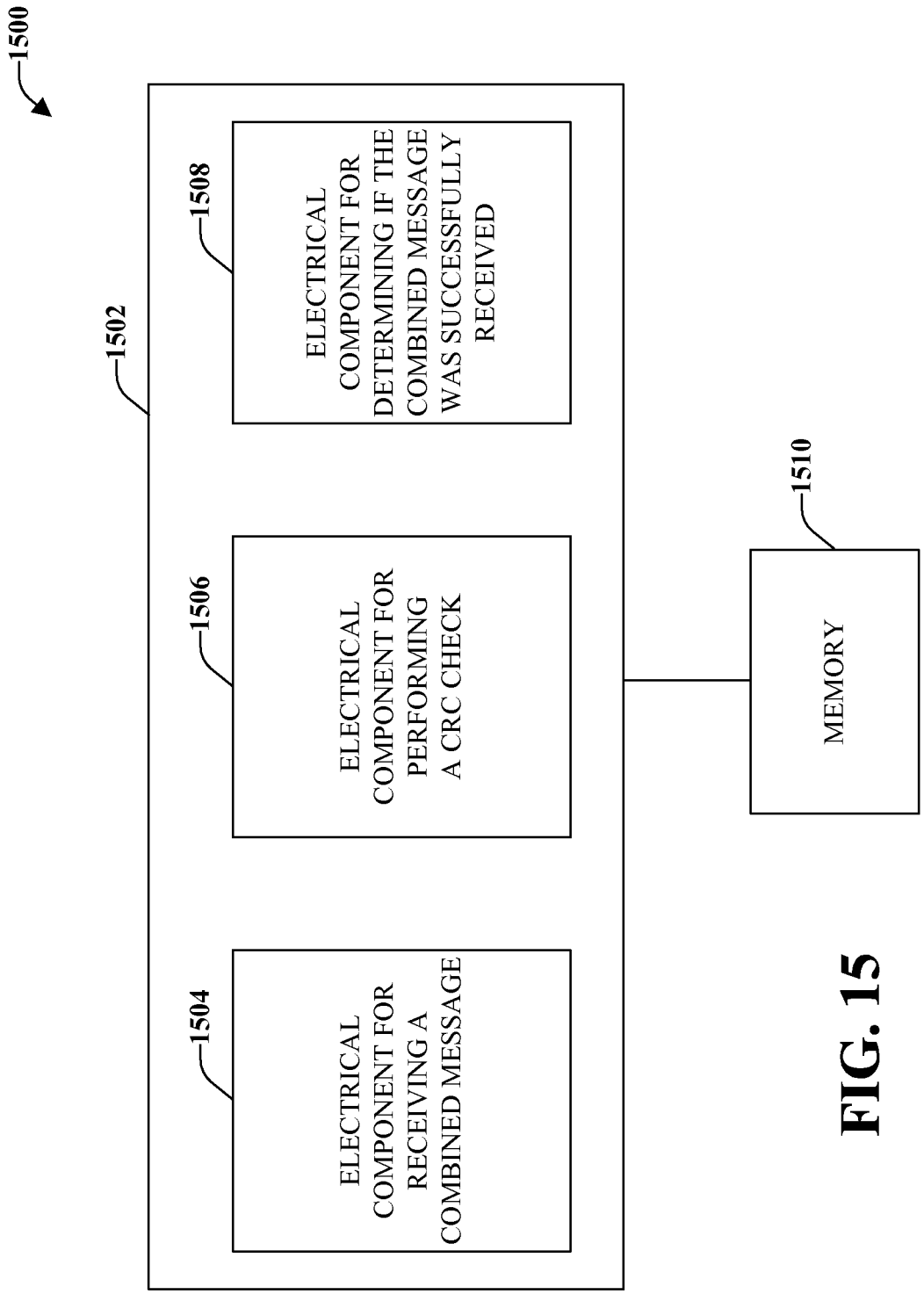
FIG. 15 illustrates an example system that receives a message that includes a hierarchical cyclic redundancy check (CRC) according to an aspect.

FIG. 15 illustrates an example system 1500 that receives a message that includes a hierarchical cyclic redundancy check (CRC) according to an aspect. System 1500 is represented as including functional blocks, which may be functional blocks that represent functions implemented by a processor, software, or combination thereof (e.g., firmware).

System 1500 includes a logical grouping 1502 of electrical components that can act separately or in conjunction. Logical grouping 1502 can include an electrical component 1504 for receiving a combined message that includes a first message and a second message. Also included can be an electrical component 1506 for performing a CRC check. Further, logical grouping 1502 can include an electrical component 1508 for determining whether the combined message was successfully received.

In accordance with some aspects, logical grouping 1502 can include an electrical component for dividing the combined message with L3 bits CRC divisor to obtain a first remainder. Further, logical grouping 1502 can include an electrical component for determining the first remainder is zero. If the first remainder is zero the combined message was not received successfully. Also included is an electrical component for removing the last L3 CRC bits to obtain a second remainder if the first remainder is not zero. Further, logical grouping 1502 can include an electrical component for comparing the second remainder with the second message (known a priori) and an electrical component for determining the combined message was successfully received if the second remainder matches the second message.

According to some aspects, logical grouping 1502 includes an electrical component for calculating (L2+L3) bits of CRC for the first message to obtain a first result and an electrical component for performing a bitwise XOR operation of the first result and last (L2+L3) bits of the received message to obtain a second result. Logical grouping 1502 can also include an electrical component for sending the second result for a L3 bits CRC check and an electrical component for removing the last L3 CRC bits to obtain a third result if the L3 bits CRC check passed. The combined message was not successfully received if the L3 bits CRC check failed. Further, logical grouping 1502 can include an electrical component for comparing the third result with a second message and an electrical component for determining the combined message was successfully received if the third result matches the second message. The combined message was not successfully received if the third result does not match the second message.

System 1500 can include a memory 1510 that retains instructions for executing functions associated with electrical components 1504, 1506, and 1508 or other components. While shown as being external to memory 1510, it is to be understood that one or more of electrical components 1504, 1506, and 1508 can exist within memory 1510.

It is to be understood that the aspects described herein may be implemented by hardware, software, firmware or any combination thereof When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine-readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for enabling hierarchical cyclic redundancy check (CRC) protection in a communication environment, comprising:
   generating a transmission message based on a first message and a second message,
   the generating the transmission message including applying a CRC encoding scheme to the first message and second message, wherein the CRC encoding scheme provides a first protection level to a receiver based on the receiver having no knowledge of the first message and second message and a second protection level higher than the first protection level to the receiver based on the receiver having knowledge of the second message; and
   transmitting the transmission message with the applied CRC encoding scheme.

2. The method of claim 1, wherein the applying the CRC encoding scheme comprises:
   combining L1 bits of the first message with L2 bits of the second message to obtain a first combined message;
   calculating L2 bits CRC from the first combined message;
   concatenating the L1 bits of the first message with the L2 bits CRC to obtain a second combined message;
   calculating L3 bits CRC from the second combined message; and
   appending the L3 bits CRC to the second combined message to generate the transmission message, wherein L1, L2, and L3 are integers.

3. The method of claim 2, wherein the first combined message is obtained without appending one or more zeros to the first combined message.

4. The method of claim 2, wherein at least one zero is appended before the L3 bits CRC are appended to the second combined message.

5. The method of claim 1, wherein the applying the CRC encoding scheme comprises:
   calculating L2 bits CRC and L3 bits CRC for the first message, the first message comprising L1 bits;
   appending the L2 bits CRC and the L3 bits CRC to the first message to obtain a first result;
   calculating L3 bits CRC for the second message, the second message comprising L2 bits;
   appending the L3 bits CRC to the second message to obtain a second result, wherein L1, L2 and L3 are integers; and
   generating the transmission message based on the first result and the second result.

6. The method of claim 5, wherein the generating the transmission message comprises performing a bitwise XOR operation of the first result and the second result with a rightmost bit alignment to obtain the transmission message.

7. The method of claim 1, wherein the first message is not known by a plurality of devices and the second message is known a priori by one of the plurality of devices.

8. The method of claim 1, wherein the first and second messages comprise an assignment message.

9. A wireless communications apparatus, comprising:
   a memory that retains instructions related to generating a transmission message based on a first message and a second message by applying a cyclic redundancy check (CRC) encoding scheme to the first message and second message, and transmitting the transmission message with the applied CRC encoding scheme, wherein the CRC encoding scheme provides a first protection level to a receiver based on the receiver having no knowledge of the first message and second message and a second protection level higher than the first protection level to the receiver based on the receiver having knowledge of the second message; and
   a processor, coupled to the memory, configured to execute the instructions retained in the memory.

10. The wireless communications apparatus of claim 9, wherein the first message includes L1 bits and the second message includes L2 bits, the memory further retains instructions related to combining the L1 bits with the L2 bits to obtain a first combined message, calculating L2 bits CRC from the first combined message, concatenating the L1 bits with the L2 bits CRC to obtain a second combined message, calculating L3 bits CRC from the second combined message, and appending the L3 bits CRC to the second combined message to generate the transmission message, wherein L1, L2, and L3 are integers.

11. The wireless communications apparatus of claim 10, wherein the first combined message is obtained without appending zeros to the first combined message.

12. The wireless communications apparatus of claim 10, wherein at least one zero is appended before the L3 bits CRC are appended to the second combined message.

13. The wireless communications apparatus of claim 9, the memory further retains instructions related to calculating L2 bits CRC and L3 bits CRC for the first message, the first message comprising L1 bits, appending the L2 bits CRC and the L3 bits CRC to the first message to obtain a first result, calculating L3 bits CRC for the second message, the second message comprising L2 bits, appending the L3 bits CRC to the second message to obtain a second result, wherein L1, L2, and L3 are integers, and generating the transmission message based on the first result and the second result.

14. The wireless communications apparatus of claim 13, wherein the generating the transmission message comprises performing a bitwise XOR operation of the first result and the second result with a rightmost bit alignment to obtain the transmission message.

15. The wireless communications apparatus of claim 9, wherein the first message is unknown by a plurality of devices and the second message is known a priori by one of the plurality of devices.

16. A wireless communications apparatus that provides a hierarchical cyclic redundancy check (CRC) scheme, comprising:
    means for generating a transmission message based on a first message and a second message,
    the means for generating the transmission message configured for applying a CRC encoding scheme to the first message and second message; and
    means for conveying the transmission message with the applied CRC encoding scheme, wherein the CRC encoding scheme provides a first protection level to a receiver based on the receiver having no knowledge of the first message and second message and a second protection level higher than the first protection level to the receiver based on the receiver having knowledge of the second message.

17. The wireless communications apparatus of claim 16, further comprising:
    means for combining L1 bits of the first message with L2 bits of the second message to obtain a first combined message without appending one or more zeros to the first combined message;
    means for calculating L2 bits CRC from the first combined message;
    means for concatenating the L1 bits of the first message with the L2 bits CRC to obtain a second combined message;
    means for calculating L3 bits CRC from the second combined message; and
    means for appending the L3 bits CRC to the second combined message to generate the transmission message,
    wherein at least one zero is appended before the L3 bits CRC are appended to the second combined message, L1, L2, and L3 are integers, and the first message is unknown by a plurality of devices and the second message is known by one of the plurality of devices.

18. The wireless communications apparatus of claim 16, further comprising:
    means for calculating L2 bits CRC and L3 bits CRC for the first message, the first message comprising L1 bits;
    means for appending the L2 bits CRC and the L3 bits CRC to the first message to obtain a first result;
    means for calculating L3 bits CRC for the second message, the second message comprising L2 bits; and
    means for appending the L3 bits CRC to the second message to obtain a second result, wherein L1, L2, and L3 are integers, and
    wherein the means for generating the transmission message generates the transmission message based on the first result and the second result.

19. A computer program product, comprising:
    a non-transitory computer-readable medium comprising:
    a first set of codes for causing a computer to generate a transmission message based on a first message and a second message;
    a second set of codes for causing the computer to generate the transmission message by applying a cyclic redundancy check (CRC) encoding scheme to the first message and second message, wherein the CRC encoding scheme provides a first protection level to a receiver based on the receiver having no knowledge of the first message and second message and a second protection level higher than the first protection level to the receiver based on the receiver having knowledge of the second message; and
    a third set of codes for causing the computer to send the transmission message with the applied CRC encoding scheme, wherein the first message is unknown by a plurality of devices and the second message is known a priori by one of the plurality of devices.

20. At least one processor configured to provide hierarchical cyclic redundancy check (CRC) information, comprising:
    a first module for generating a transmission message based on a first message and a second message;
    a second module for applying a CRC encoding scheme to the first message and second message; and
    a third module for transmitting the transmission message with the applied CRC encoding scheme, wherein the CRC encoding scheme provides a first protection level to a receiver based on the receiver having no knowledge of the first message and second message and a second protection level higher than the first protection level to the receiver based on the receiving having knowledge of the second message.

\* \* \* \* \*